(12) United States Patent
Schreck

(10) Patent No.: US 7,909,598 B2
(45) Date of Patent: Mar. 22, 2011

(54) HOT RUNNER NOZZLE FOR AN INJECTION MOLDING DEVICE

(75) Inventor: Hans Schreck, Burgwald-Bottendorf (DE)

(73) Assignee: Heitec-Heisskanaltechnik GmbH, Burgwald-Bottendorf (DE)

( * ) Notice: Subject to any disclaimer, the term of this patent is extended or adjusted under 35 U.S.C. 154(b) by 147 days.

(21) Appl. No.: 12/339,531

(22) Filed: Dec. 19, 2008

(65) Prior Publication Data

US 2009/0169672 A1    Jul. 2, 2009

(30) Foreign Application Priority Data

Dec. 27, 2007   (DE) .................. 10 2007 063 300

(51) Int. Cl.
*B29C 45/20*    (2006.01)
(52) U.S. Cl. .................... 425/549; 264/328.9
(58) Field of Classification Search .............. 425/549, 425/564; 264/328.9
See application file for complete search history.

(56) References Cited

U.S. PATENT DOCUMENTS

| | | | |
|---|---|---|---|
| 5,980,237 A * | 11/1999 | Swenson et al. | 425/549 |
| 6,533,571 B2 * | 3/2003 | Fikani | 425/549 |
| 6,619,948 B2 | 9/2003 | Gunther | |
| 6,797,925 B1 | 9/2004 | Gunther et al. | |
| 7,118,704 B2 | 10/2006 | Olaru | |
| 7,207,796 B2 * | 4/2007 | Rosner | 425/549 |
| 7,217,120 B2 | 5/2007 | Noot | |

FOREIGN PATENT DOCUMENTS

| | | |
|---|---|---|
| DE | 29610268 U1 | 10/1996 |
| DE | 19723374 A1 | 12/1997 |
| DE | 60308469 T2 | 12/2002 |
| EP | 1428646 A1 | 6/2004 |

OTHER PUBLICATIONS

"European Search Report dated Feb. 27, 2009 for European Patent Application 08171235 which corresponds to the instant application," 5 pgs.

* cited by examiner

*Primary Examiner* — Tim Heitbrink
(74) *Attorney, Agent, or Firm* — Fredrikson & Byron, P.A.

(57) ABSTRACT

The embodiments of invention relate to a hot runner nozzle including at least one nozzle duct for a plasticized plastic, which ends in a nozzle tip and which can be temperature-controlled by a heater, wherein the hot runner nozzle can be attached to an injection molding tool or the like and wherein the heater and the nozzle duct are provided in a common housing of the hot runner nozzle laterally next to one another. The housing encompasses at least one material recess, which divides the housing adjacent to the nozzle duct and adjoining to the heater into housing regions, which are spaced apart from one another.

15 Claims, 2 Drawing Sheets

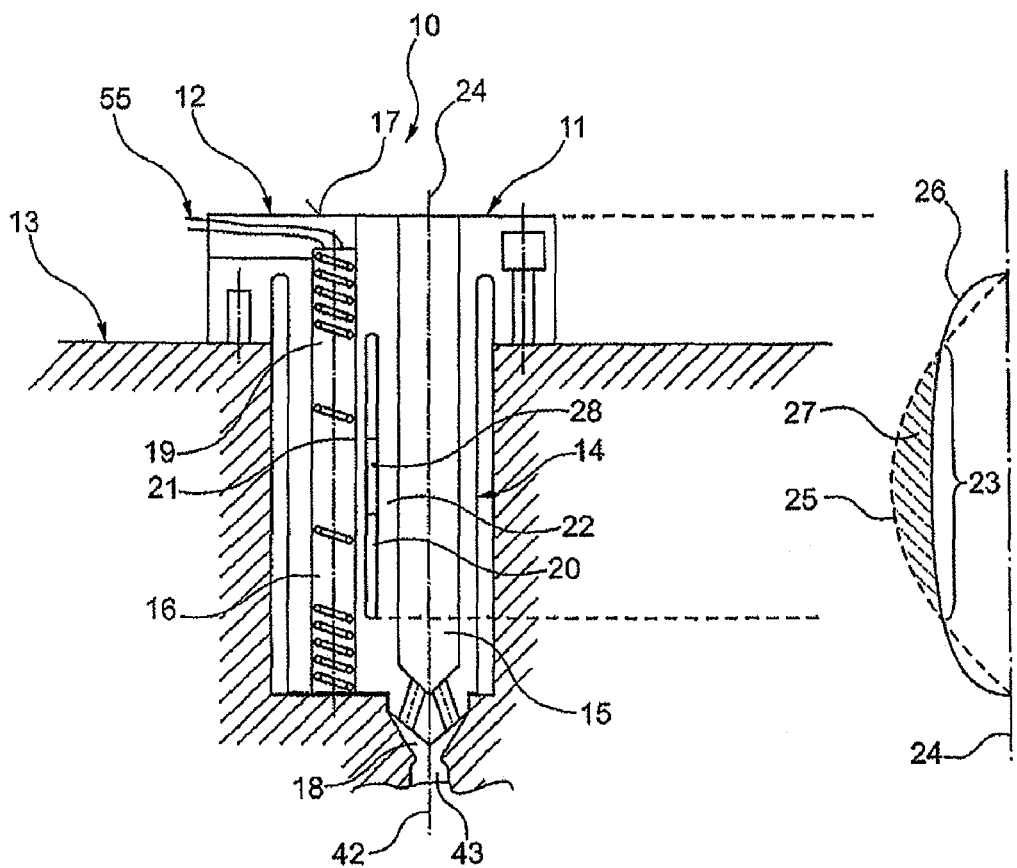
Fig. 1
Fig. 2
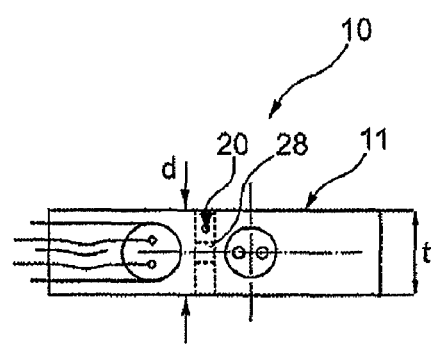
Fig. 3

HOT RUNNER NOZZLE FOR AN INJECTION MOLDING DEVICE

CROSS REFERENCE TO RELATED APPLICATIONS

This application claims priority to German Patent Application No. 10 2007 063 300.0 filed Dec. 27, 2007, the teachings of which are incorporated herein by reference.

BACKGROUND OF THE INVENTION

Hot runner nozzles are generally known. They are used in injection molds for feeding a flowable plastic material at a predefined temperature under high pressure to a separable mold block (cavity). In order that the usually hot compound would not cool down prematurely within the nozzle, one known type of system employs an electric heater that concentrically encloses a material pipe and a flow channel formed therein to hold the liquid plastic material at a constant temperature down to the nozzle tip, if possible. A disadvantage with this type of system is that the heater which concentrically encloses the material pipe takes relatively much room so that the nozzles cannot be arranged side by side as closely as perhaps desired. Many applications, however, require that the spaces between the cavities might be filled simultaneously or more complicated components might be filled by several shots at short distances.

To overcome this disadvantage, DE-U1-296 10 268 suggests to arrange the nozzle channel and the heater side by side in a common casing. Parallel to the straight nozzle runner, the casing is provided with a bore for receiving the heating unit designed as a rod-shaped heater that almost reaches to the nozzle tip.

Also, due to the arrangement of nozzle duct and heater next to one another, hot runner nozzles of the afore-mentioned type, contrary to conventional nozzles where the heater is arranged so as to be concentric to the nozzle duct, are useful in particularly narrow environments which enables the use of this type of hot runner nozzle for injection molding tools having mold cavities, that are arranged so as to be located next to one another in a particularly narrow manner. However, depending on the given mounting or particular attachment methods, a more or less distinct lateral displacement of the hot runner nozzle can take place in response to the thermal expansion behavior of the hot runner nozzles due to the lateral arrangement of the heater to the nozzle duct, as opposed to a concentric arrangement.

SUMMARY

The embodiments of the invention relate to a hot runner nozzle for an injection molding device comprising at least one nozzle duct for a plasticized plastic, which ends in a nozzle tip and which can be temperature-controlled by means of a heater, wherein the hot runner nozzle can be attached to an injection molding tool or the like and wherein the heater and the nozzle duct are provided in a common housing of the hot runner nozzle laterally next to one another. The embodiments of the invention are thus based on the object of proposing a hot runner nozzle of the afore-mentioned type, which enables the advantageous narrow embodiment without leading to undesired impacts of the efficient function of the hot runner nozzle due to the asymmetrical heating of the nozzle duct.

BRIEF DESCRIPTION OF THE DRAWINGS

FIG. 1 is a cross-sectional view of a hot runner nozzle according to an embodiment of the invention.

FIG. 2 shows a diagram for illustrating the temperature sequence across the nozzle duct axis.

FIG. 3 is a top view of the hot runner nozzle illustrated in FIG. 1.

DETAILED DESCRIPTION

Figure 4:
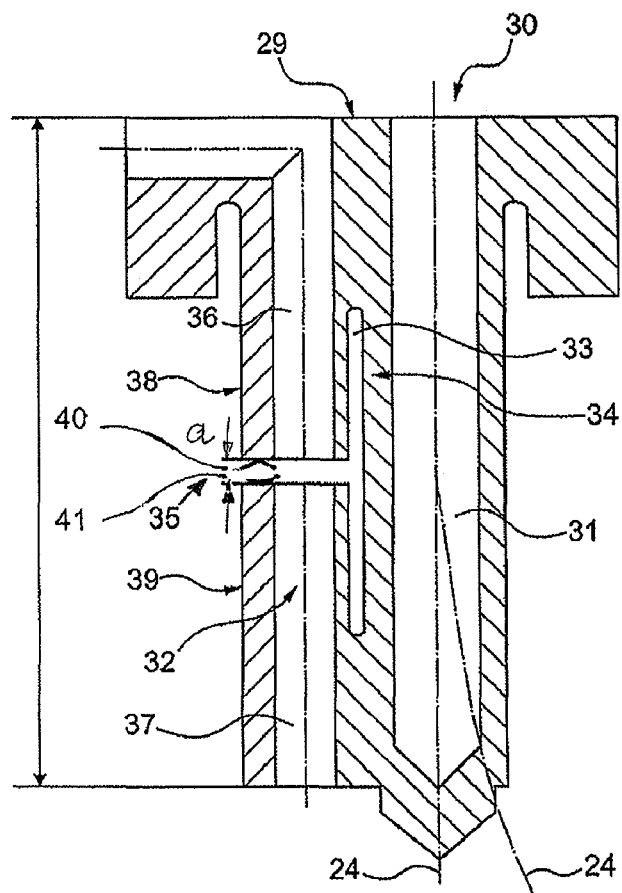
FIG. 4 is a cross-sectional view of a hot runner nozzle according to another embodiment of the invention.

In the hot runner nozzle according to embodiments of the invention, the housing of the hot runner nozzle includes at least one material recess that divides the housing adjacent to the nozzle duct and adjoining to the heater into housing regions, which are spaced apart from one another. According to these embodiments, because of the recess made between the nozzle duck and the heater, the heat transition from the heater to the nozzle duct due to the material of the housing is impacted, namely the heat transition resistance in the region of the recess is increased because of the recess. Because of this, the part of the nozzle duct which is arranged adjacent to the recess, is impinged with heat to a comparatively lower degree than portions of the duct not adjacent to the recess. Thus, the nozzle duct is heated to a relatively higher degree in longitudinal direction of the nozzle duct above and below the region of the recess. Through this, temperature profiles can be adjusted in the longitudinal direction of the nozzle duct. Said temperature profiles can counteract an excessive deformation of the hot runner nozzle by avoiding temperature peaks. Furthermore, such temperature profiles can also be used so as to locally impact and adjust, respectively, the viscosity of the plasticized plastic in the nozzle duct. Through this, a blockage and an undesired pressure build-up, respectively, can be counteracted, for example by preventing heat sinks at problematic cross-sectional transitions in the region of the nozzle duct or in adjoining regions of the plastic duct.

According to a preferred embodiment of the invention, the material recess is embodied as at least one longitudinal slot, which runs in the longitudinal direction of the housing, which separates a heating region of the housing, which accommodates the heater, between a housing base for connection to an injection molding tool and a housing head for accommodating a nozzle tip from a nozzle duct region, in which the nozzle duct is embodied. In such an embodiment, the temperature profile, which normally increases strongly from the housing base to a central section of the nozzle duct and likewise from the nozzle tip to the central section of the nozzle duct by forming a "temperature belly" in the central region of the nozzle duct can be changed into a largely constant temperature profile.

It can also prove to be advantageous when the material recess is embodied as at least one transverse slot, which runs at right angles to the longitudinal direction of the housing, which divides a heating region of the housing, which accommodates the heater, between a housing base for connecting to an injection molding tool and a housing head for accommodating a nozzle tip into at least two partial heating regions, which are axially separated from one another. Such an embodiment does not only make it possible to impact the "temperature belly" in the central region of the nozzle duct but the possible heat expansion of the heating region of the housing in axial direction is considerably reduced by the axial division into two partial heating regions. Through this, a temperature deformation of the housing, which is oriented at right angles to the longitudinal direction of the nozzle duct, can be specifically counteracted.

When, according to a further preferred embodiment, the longitudinal slot and the transverse slot are embodied so as to merge for forming a T-shaped slot, it is possible to adjust a defined temperature profile above the nozzle duct as well as a defined lateral deformation, that is, aligned at right angles to the nozzle duct, by a corresponding selection of the proportionate slot lengths of the transverse slot and of the longitudinal slot as well as of the slot widths.

A further possibility of the differentiation with regard to the effects on the temperature profile, which can be determined by the slot embodiment, and on the deformation behavior becomes possible when a plurality of slots are arranged in the longitudinal direction of the housing in a row so as to be axially spaced apart from one another.

Depending on the embodiment of the cross section of the housing, the slots can thereby be arranged so as to be equally spaced and they can have different axial distances to one another for the purpose of generating a defined heat transition profile.

A further possibility for impacting the temperature profile as well as the deformation behavior of the housing lies in the embodiment of the heater as a rod-shaped heater, which is arranged in an accommodation bore and so as to be parallel to the nozzle duct. Said heater encompasses heater segments, which are embodied according to the axial distances of the slots. It is thus possible to embody the individual heater segments in such a manner that they are in each case completely accommodated in the partial housing regions, which are separated from one another by means of the slots.

When the housing is embodied in a T-shaped manner comprising a housing base, which is embodied as a base part, which has a larger material cross section as compared to a piston art, which accommodates the nozzle duct and the heater, the material recesses according to embodiments of the invention, which are preferably embodied as slots, can be used in a particularly advantageous manner so as to be able to specifically counteract the formation of a heat sink in the transition region between the base part and the piston part. The impact of the heat sink, which is caused by construction, on the viscosity of the plasticized plastic, which is transported in the nozzle duct, and the lateral deformation of the piston part can thus be specifically impacted and attenuated, respectively.

FIG. 1 shows a hot runner nozzle 10 comprising a housing 11, which encompasses a base part 12 for fastening to an injection molding tool 13 and a piston part 14, which encompasses a nozzle duct 15 and a heating duct 16, which are arranged next to one another and parallel with one another and which extend in longitudinal direction of the housing 11.

The nozzle duct 15 extends from a contact surface 17 at the base part 12, to which a cast feed (not illustrated) can be coupled, and terminates at a nozzle tip 18, which is arranged at the free end of the piston part 14.

The heating duct 16 is embodied as a through-duct and, as illustrated in FIG. 1, serves for accommodating a rod-shaped heater 19, which is preferably embodied as an electric resistance heater, which is energized via a supply line 55, which is laterally inserted into the base part 12. Of course, the rod-shaped heater 19 may be other types than an electric resistance heater and the invention is not limited to a particular type of heater.

As can further be seen from FIG. 1, the housing 11 is provided with a recess, which is embodied herein as a longitudinal slot 20, in a region between the nozzle duct 15 and the heating duct 16. Said recess embodies a thermal insulation between an adjacent wall region 21 of the heating duct 16 and an adjoining wall region 22 of the nozzle duct 15. Due to its thermally insulating effect, the longitudinal slot 20 causes a relative cooling of a central section 23 of the nozzle duct 15, as is illustrated in FIG. 2 by means of the qualitative illustration of the temperature sequence across a nozzle duct axis 24.

In FIG. 2, the temperature profile 25 illustrated by a dot and dash line 25, as it appears in a hot runner nozzle, corresponding to the hot runner nozzle 10 illustrated in FIG. 1, without the longitudinal slot 20. The temperature profile 26 illustrated by a solid line, as it appears in a hot runner nozzle corresponding to the hot runner nozzle 10 illustrated in FIG. 1 with the longitudinal slot 20. As becomes clear by a comparison of the temperature profile 26 with the temperature profile 25 in FIG. 2, the insulation path embodied by the longitudinal slot 20 leads to a reduction of a "temperature belly" 27 located in the central section 23 of the nozzle duct 15.

It becomes clear from the context of the illustration between FIGS. 1 and 2 that the length of the longitudinal slot 20 is directly associated with the reduction amount of the "temperature belly."

As can be seen in particular from FIG. 3, the longitudinal slot 20 is embodied in such a manner that it encompasses a depth t, which corresponds to the thickness d of the housing 11, and thus penetrates the entire cross section. Depending on the extent in which an impact of the temperature profile 26, which appears via the nozzle duct axis 24, is desired, it is also possible not to embody the longitudinal slot 20 so as to be continuous, as is illustrated in FIG. 3, but to provide material bridges 28, which are illustrated herein by means of a dot and dash line, which enable a specific reduction of the insulating effect of the longitudinal slot 20 at discrete locations.

FIG. 4 shows a housing 29 of a hot runner nozzle 30 according to another embodiment of the invention. A longitudinal slot 33 is included between a nozzle duct 31 and a heating duct 32. The longitudinal slot 33 transitions into a transverse slot 35 for forming an altogether T-shaped slot 34. The transverse slot 35 with the slot width a defines an expansion gap, which divides the heating duct 32 into two heating duct sections 36 and 37, which are thermally separated from one another.

Figure 5:
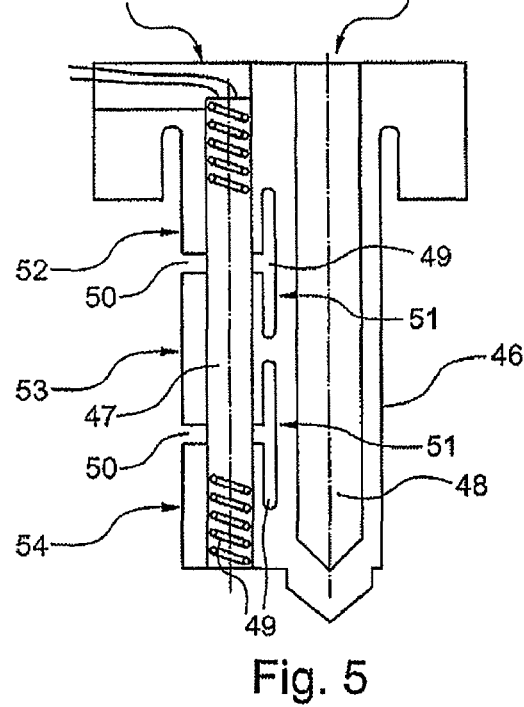
FIG. 5 is a cross-sectional view of a hot runner nozzle according to still another embodiment of the invention.

In response to a heating of the heating duct nozzle 30 by means of a heater, which is inserted into the heating duct 32, the duct walls 38 and 39 of the heating duct sections 36 and 37, which are embodied so as to be approximately bushing-shaped in the region of the transverse slot 35, are heated. Consequently, free front edges 40, 41 of the heating duct sections 36 and 37 approach one another while reducing the slot width a, due to the temperature-related axial expansion of the heating duct sections 36 and 37. Due to the free axial expansion possibility of the front edges 40, 41, a thermally contingent bending moment about a bending axis, which runs perpendicular to the drawing plane in this case, which leads to a lateral displacement of the nozzle duct 31 and of the nozzle duct axis 24, respectively, which are illustrated in FIG. 4 in a dot and dash manner, can be avoided for the most part. Otherwise, such a lateral displacement of the nozzle duct could impact the desired coaxial displacement of the nozzle duct axis 24 to a mold axis 42 of a mold cavity 43 (FIG. 1), which is embodied in the injection molding tool 13, with the known disadvantageous impacts for the injection molding In a further embodiment, FIG. 5 shows a hot runner nozzle 44 including a housing 45, which includes a heating duct 47 and a piston part 46. Adjacent to the nozzle duct 48, the heating duct 47 includes two T-slots 51, which are assembled in each case from a longitudinal slot 49 and a transverse slot 50. Said T-slots 51 divide the heating duct 47 into a total of three heating duct sections 52, 53 and 54.

The invention claimed is:

1. A hot runner nozzle which can be coupled to an injection molding tool, the hot runner nozzle comprising:
a housing having at least one nozzle duct extending laterally through the housing, the nozzle duct terminating in a nozzle tip;
a heater disposed adjacent to and extending parallel with the nozzle duct and for temperature-controlling the nozzle duct;
at least one material recess located between the heater and the nozzle duct, wherein the material recess is at least one longitudinal slot which runs in the longitudinal direction of the housing which divides the housing adjacent to the nozzle duct into housing regions, which are longitudinally spaced apart from one another, wherein the material recess further includes at least one transverse slot, which runs transversely to the longitudinal direction of the housing, which divides a heating region of the housing, which accommodates the heater, between a housing base for connecting to the injection molding tool and a housing head for accommodating the nozzle tip into at least two partial heating regions, which are axially separated from one another.

2. The hot runner nozzle according to claim 1, wherein the longitudinal slot and the transverse slot are embodied so as to merge for forming a T-shaped slot.

3. The hot runner nozzle according to claim 2, wherein a plurality of slots are arranged in the longitudinal direction of the housing in a row so as to be axially spaced apart from one another.

4. The hot runner nozzle according to claim 3, wherein the slots are arranged so as to be equally spaced.

5. The hot runner nozzle according to claim 3, wherein the slots have different axial distances to one another for the purpose of generating a defined heat transition profile.

6. The hot runner nozzle according to claim 3, wherein the heater is a rod-shaped heater, located in a heating duct that is parallel to the nozzle duct, said heater encompassing heater segments, which are embodied according to the axial distances of the slots.

7. The hot runner nozzle according to claim 6, wherein the housing comprises a housing base, which has a larger material cross section as compared to a piston part, which accommodates the nozzle duct and the heater.

8. The hot runner nozzle according to claim 7, wherein the housing is embodied in a T-shaped manner.

9. A hot runner nozzle which can be coupled to an injection molding tool, the hot runner nozzle comprising:
a housing having at least one nozzle duct extending laterally through the housing, the nozzle duct terminating in a nozzle tip;
a heater disposed adjacent to and extending parallel with the nozzle duct and for temperature-controlling the nozzle duct;
at least one material recess located between the heater and the nozzle duct, which divides the housing adjacent to the nozzle duct into housing regions, which are spaced apart from one another; wherein the material recess further includes at least one transverse slot, which runs transversely to the longitudinal direction of the housing, which divides a heating region of the housing, which accommodates the heater, between a housing base for connecting to the injection molding tool and a housing head for accommodating the nozzle tip into at least two partial heating regions, which are axially separated from one another.

10. The hot runner nozzle according to claim 9, wherein a plurality of slots are arranged in the longitudinal direction of the housing in a row so as to be axially spaced apart from one another.

11. The hot runner nozzle according to claim 10, wherein the slots are arranged so as to be equally spaced.

12. The hot runner nozzle according to claim 10, wherein the slots have different axial distances to one another for the purpose of generating a defined heat transition profile.

13. The hot runner nozzle according to claim 10, wherein the heater is a rod-shaped heater, located in a heating duct that is parallel to the nozzle duct, said heater encompassing heater segments, which are embodied according to the axial distances of the slots.

14. The hot runner nozzle according to claim 13, wherein the housing comprises a housing base, which has a larger material cross section as compared to a piston part, which accommodates the nozzle duct and the heater.

15. The hot runner nozzle according to claim 14, wherein the housing is embodied in a T-shaped manner.

\* \* \* \* \*